United States Patent Office 3,043,810
Patented July 10, 1962

3,043,810
LINEAR POLYAMIDES FROM BIS-(OMEGA-AMINOALKYL) PHOSPHINES AND DICARBOXYLIC ACIDS
William G. Deichert, Flushing, N.Y., and Joseph J. Pellon, New Canaan, Conn., assignors to American Cyanamid Company, New York, N.Y., a corporation of Maine
No Drawing. Filed Aug. 19, 1959, Ser. No. 834,668
13 Claims. (Cl. 260—78)

The invention relates broadly to polymeric materials and, more particularly, to linear polymers. Still more particularly the invention relates to synthetic linear condensation polymers in which phosphorus is an integral part of the polymer molecule. These new linear polymers have characteristic properties that make them especially valuable for use in adhesive, coating, impregnating and other applications. Certain of these new polymers, e.g., those having an intrinsic viscosity of at least 0.3, are particularly useful as fiber-forming and/or film-forming materials from which can be made fibers or films having characteristic properties that render them eminently suitable for various consumer and industrial applications, especially where it is desired to provide a fiber, fabric or film having flame-resistant characteristics. The lower-molecular-weight polymers of this invention find particular utility as coating and adhesive materials, as softeners or plasticizers, or as components of such compositions. The linear polymers of this invention also can be used as molding compositions, or as components of such compositions, from which can be made a wide variety of molded articles for domestic and industrial applications.

The linear polyamides with which this invention is concerned are characterized by the fact that they contain the recurring unit structure represented by the general formula (I)  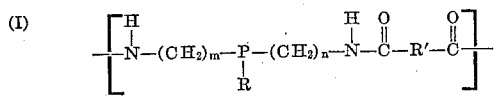

where $m$ and $n$ each represent an integer from 2 to 12, inclusive, which may be the same or different, R represents a hydrocarbon radical, and R' represents a divalent hydrocarbon radical containing from 2 to 18 carbon atoms, inclusive.

Illustrative examples of hydrocarbon radicals represented by R in Formula I are alkyl (including cycloalkyl), alkenyl (including cycloalkenyl), aralkyl, aralkenyl, aryl, alkaryl and alkenylaryl radicals. More specific examples of such radicals are methyl, ethyl, propyl to octadecyl, inclusive (both normal and isomeric forms), cyclopentyl, cyclopentenyl, cyclohexyl, cyclohexenyl, cycloheptyl, etc.; benzyl, cinnamyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthryl, benzonaphthyl, anthryl, naphthyl-substituted anthryl, dianthryl and fluorenyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc.

Illustrative examples of divalent hydrocarbon radicals containing from 2 to 18 carbon atoms, inclusive, that are represented by R' in Formula I are: divalent aliphatic, e.g., ethylene, propylene (trimethylene), propenylene, butylene, butenylene, isobutylene, pentylene to octadecamethylene, etc., including divalent cycloaliphatic, e.g., cyclopentylene, cyclopentenylene, cyclohexylene, cyclohexenylene, cycloheptylene, etc.; divalent aromatic, e.g., phenylene, biphenylene, naphthylene, etc.; divalent aliphatic-substituted aromatic, e.g., 2,4-tolylene, ethyl-2,5-phenylene, isopropyl-3,4-phenylene, 1-butyl-2,4-naphthylene, etc.; divalent aromatic-substituted aliphatic, e.g., phenylethylene, phenylpropylene, naphthylisobutylene, xylene, alpha-(4-tolylene) beta'-butyl, etc.; and radicals that may be classed either as divalent aromatic-substituted aliphatic or divalent aliphatic-substituted aromatic, e.g., 4,alphatolylene, 3,beta-phenyleneethyl, 4,alpha-xylylene, 2,gamma-phenylenebutyl, etc. Thus, R' may represent a divalent hydrocarbon radical represented by the formula —Ar—R"—Ar— where Ar represents an arylene radical and R" represents an alkylene radical. It will be noted that the foregoing illustrative examples of divalent hydrocarbon radicals represented by R' include such radicals which contain from 2 to 14 carbon atoms, inclusive, and that these examples specifically include alkylene radicals which contain from 2 to 10 carbon atoms, inclusive.

It was known prior to the present invention that difunctional reactants could be reacted under conditions such that there are formed linear condensation superpolymers that can be converted into commercially useful oriented filaments. The preparation of such linear condensation superpolymers is described in, for instance, Carothers U.S. Patents 2,071,250; 2,071,251; 2,071,253; 2,130,-523; 2,130,948; and Morgan U.S. Patent 2,646,420. The last-named patent is directed to synthetic linear condensation polymers containing one or more phosphorus atoms as a part of the polymer chain, and having a recurring structural unit selected from the group consisting of (II) 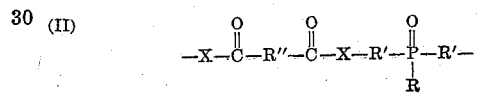

and (III) 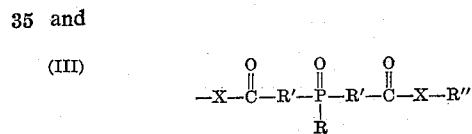

and (IV) 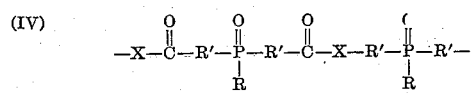

wherein R may be any monovalent hydrocarbon radical, R' is a divalent hydrocarbon radical from the group consisting of divalent aromatic and cycloaliphatic hydrocarbon radicals, R" may be any divalent hydrocarbon radical, and X is selected from the group consisting of nitrogen and oxygen.

The present invention is based on our discovery that linear polyamides containing the recurring unit structure represented by the aforementioned general Formula I have, in general, a surprising and unexpected high order of adhesiveness in addition to the other useful properties hereinbefore mentioned. For example, a thin film of a linear polyamide prepared by condensation of bis(3-aminopropyl)phenylphosphine and adipic acid was used to adhesively bond together two blocks of aluminum. The bonded aluminum blocks were then placed in a device which could exert and measure the pulling force. The device failed at a force of 4,700 p.s.i. at which point the blocks had not separated. In a similar test most of the presently available commercial adhesives generally result in separation of the blocks at a force of less than 1,000 p.s.i., e.g., from 50 to 500 p.s.i.

The linear polyamides of the present invention are prepared, for example, by effecting a condensation reaction between substantially equal molar proportions of two different difunctional reactants, one of which is a phosphine represented by the general formula (V) 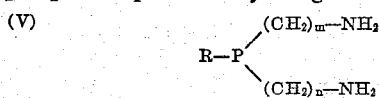

wherein R, m and n have the same meanings as given above with respect to Formula I. The other difunctional reactant can be a dicarboxylic acid or anhydride, or an amide-forming derivative of such an acid or anhydride (if available), wherein the carboxy (or other amide-forming) groups are attached directly to a divalent hydrocarbon radical having from 2 to 18 carbon atoms, inclusive, the amide-forming groups being the sole reactive groups which are present therein. The expression "sole reactive groups" as used herein and in the appended claims is not intended to include within its meaning any olefinic or acetylenic unsaturation between adjacent carbon atoms as in, for example, the ethylenically and acetylenically unsaturated aliphatic dicarboxylic acids. The expression "reactive groups" refers to groups which are reactive in the condensation reaction involved in this invention.

When a dicarboxylic acid (either preformed or formed in situ) is employed, the first product that is formed when it is brought into reactive relationship with the diamine is a diamine-dicarboxylic acid salt, which is usually crystalline in nature and readily purified by recrystallization from a suitable solvent. This salt may be employed as the starting material in forming the linear condensation polyamide.

By the above-described general method, the polymer-forming reaction is continued by removing water, e.g., by heating and/or vacuum. The temperatures employed are generally within the range of from about 150° C. to about 325° C.

The reaction may be carried out in the presence or absence of a suitable inert, liquid, reaction medium (solvent or diluent), for example in an acidic solvent such as, for instance, phenols, cresols, or solvents such as dimethyl-formamide or other highly polar solvents; or in diluents (that is, liquid media in which the reactants are substantially insoluble), e.g., high-boiling aliphatic or aromatic hydrocarbons, or ethers such as diphenyl ether, etc. It is continued until a linear polyamide having the desired average molecular weight, as indicated by its intrinsic viscosity is obtained. The intrinsic viscosity in formic acid at 30° C. may range, for instance, from 0.05 to 5 or higher. For example, the reaction may be continued until a polymer having fiber-forming characteristics is formed, that is, one having an intrinsic viscosity in formic acid at 30° C. of at least 0.3. A general idea of when this stage is reached can be ascertained by touching the molten polymer with a glass rod and drawing the rod away; if a continuous filament having considerable strength and pliability is readily formed by this technique, the linear polyamide may be considered to be at the fiber-forming stage.

By another method, using the so-called "interfacial" polymerization technique, linear condensation polyamides also can be prepared by employing two different immiscible solvents in one of which is dissolved one of the reactants, e.g., the diamine, and in the other of which is dissolved the other of the reactants, e.g., an acyl halide (acyl dihalide) of a dicarboxylic acid. The mixture is stirred, and reaction takes place at the interface between the two immiscible solvents.

In general, the reaction can be carried out at room temperature (20°–30° C.); or, with certain reactants, higher or lower temperatures may be either necessary or advantageous, e.g., as low as −30° C. or as high as 100° or 150° C.

The resulting condensation polymer is isolated by, for example, continuously drawing off the formed polymer at the interface without agitating the reaction mass; or alternatively, by agitating the mass so that the polymer is uniformly distributed throughout, and then separating the polymer by the usual filtration technique.

In order that those skilled in the art may better understand how the present invention can be carried into effect, the following examples are given by way of illustration and not by way of limitation. All parts and percentages are by weight unles otherwise stated.

EXAMPLE 1

A. *Preparation of Bis(3-Aminopropyl)Phenylphosphine*

(VI) 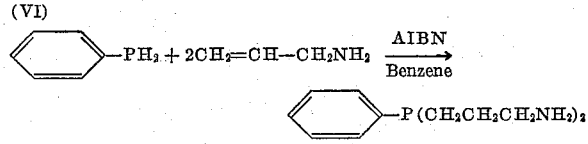

NOTE.—AIBN=Azoisobutyronitrile.

Approximately 100 ml. (98.7 g.; 0.90 mole) of phenylphosphine is added by pipette to a stirred solution of azobisisobutyronitrile (8 g.; 0.05 mole), in 100 ml. of benzene under a nitrogen atmosphere. This mixture is gently warmed to 70°–75° C. and then the allyl amine (114.18 g.; 2.0 moles) is slowly added at such a rate that the temperature remains between 70°–80° C., after which the mixture is kept at 70°–75° C. for five hours by application of heat. The solvent and unreacted starting material are stripped off and 191 g. of crude product (94.5%) is obtained with $n_D^{27}=1.5795$.

An analytical sample is obtained by fractionation havin B.P. 147°–148° C./0.4 mm., $n_D^{26}=1.5715$, and

| | C | H | N | P |
|---|---|---|---|---|
| Calcd. for $C_{12}H_{21}N_2P$, Percent | 64.25 | 9.44 | 12.49 | 13.81 |
| Found, Percent | 63.93 | 9.64 | 11.60 | 13.56 |

Following the same general technique described above for the preparation of bis(3-aminopropyl)phenylphosphine, other substituted phosphines embraced by Formula V and used in practicing the present invention can be prepared. Other methods that will be obvious to those skilled in the art also may be employed.

B. *Preparation of Polyamide from Bis(3-Aminopropyl) Phenylphosphine and Adipic Acid*

(VII) 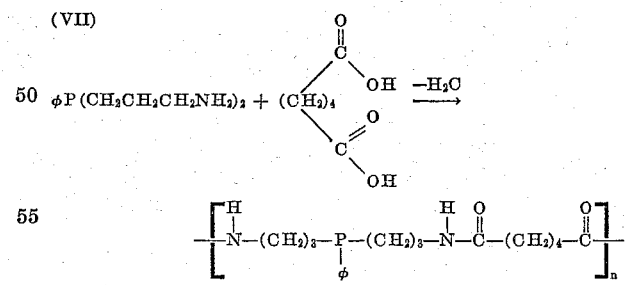

NOTE.—$\phi$=phenyl where it appears herein.

The first step in the polymerization involves the formation and purification of the amine salt. Thus 22.4 g. (0.1 mole) of the diamine in 20 ml. of ethanol is added to 14.6 g. (0.1 mole) of the diacid (adipic acid) dissolved in 80 ml. of ethanol. Salt formation occurs within 15 minutes (seed crystals are added) and the white, crystalline product is isolated in a Büchner funnel. This material is further purified by two subsequent recrystallizations from ethyl alcohol. The yield after drying in a vacuum oven overnight at 60° C. amounts to 25 g. (68% of theory) of a white solid, M.P. 157°–158° C. with a purity of 99.6% as determined by non-aqueous titration procedures.

The polyamide is then prepared by dissolving the salt (10.3 g.) in 26 ml. of cresol in a suitable vessel and gradually raising the temperature to 150° C. over a period of one hour. A stream of $N_2$ is maintained over the reaction mass during this preparation. Additional cresol (about 5 ml.) is added to fluidize the mixture which is kept at 150° C. for six hours, after which the cresol is removed by first heating to 250° C. with increased flushing with $N_2$, and then heating at 120° C. in a vacuum oven for about 16 hours. The resulting polymer is a tough, celar, tan-colored material which adheres strongly to the glass. Wt. 9.3 g. (90% yield).

This material is found to have the following properties:

(1) Intrinsic viscosity ($\eta$) in formic acid at 30° C.=0.96.
(2) Heating on a Fisher-John melting point apparatus causes it to soften at 50°–60° C. and flow at about 90° C.
(3) Soluble in formic acid, cresol and dimethyl-formamide.
(4) Does not support combustion.
(5) Fibers are readily formed from the molten material and qualitatively show good strength.
(6) Adheres strongly to metal, ceramic and glass. The adhesive behavior of this material is subjected to quantitative measurement.

(a) Tensile strength on aluminum metal: The polymer is melted on an aluminum block to form a thin, liquid film. A second aluminum block is placed over the film, and the bonded blocks are cooled. The bonded aluminum blocks are then placed in a device which can exert and measure the pulling force. The device fails at a force of 4700 p.s.i., at which point the blocks do not separate.

(b) Shear test—adherend=1″ wide steel strips with 1″ overlap. Standard shear test: One inch wide untreated steel strips are bonded in the manner just described with 1″ overlap and subjected to a pulling force. Average shear strength of the bond is found to be 3411 p.s.i.

These values are in the range of the best adhesives produced today. This is further illustrated by the comparison given in the following table.

TABLE.—COMPARISON OF ADHESIVE PROPERTIES OF SEVERAL POLYMERS

[Shear test adherend=1″ wide steel strips with 1″ overlap]

| Polymer Type | Reactants | Average Shear, p.s.i. | Range, p.s.i. |
|---|---|---|---|
| Polyamide | ⌬-P-(CH₂CH₂CH₂NH₂)₂ | 3,411 | 3,412 3,410 |
| | Adipic acid | | |
| Polyamide | Hexamethylenediamine | 66 | 90 |
| | Adipic acid | | 27 |
| Polyester | Terephthalic acid | 2,327 | 2,489 |
| | Ethylene glycol | | 2,188 |

EXAMPLE 2

*Preparation of Polyamide from Bis (3-Aminopropyl) Phenylphosphine and Terephthalic Acid*

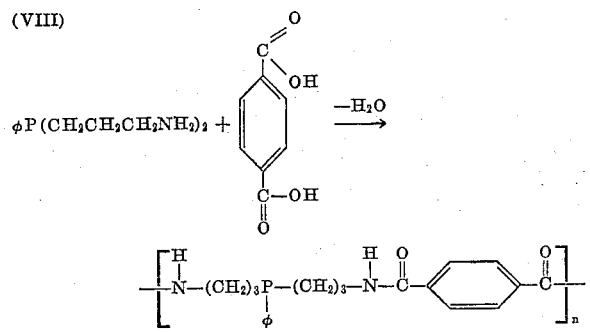

The procedure of Example 1–B is followed using 16.6 g. of terephthalic acid and 22.4 g. of the diamine. There is obtained 16.6 g. of salt which cannot be induced to form highly crystalline product. This salt is polymerized by the solvent technique described in 1–B, yielding 13 g. (approximately 100% of the theoretical) of a pale yellow, brittle polymer, which readily forms fibers from the molten state. It has the following properties:

(1) Intrinsic viscosity ($\eta$) in formic acid at 30° C.=0.18.
(2) Softens at 115°–120° C. and flows at 125° C. Melts to a clear liquid with no change up to 250°–300° C.

The polymer of this example has a much lower molecular weight than the polymer of Example 1–B, presumably because the salt cannot be purified and the proportions of monomers employed are not exactly equivalent amounts. However, the higher melting or flow point as compared with that of the 1–B polymer indicates that higher melting point, linear polyamides of this type can be made.

Instead of terephthalic acid in the above formulation an equivalent amount of phthalic anhydride can be used.

EXAMPLE 3

*Preparation of Polyamide from Bis(3-Aminopropyl)-β-Phenylethylphosphine and Adipic Acid*

Essentially the same procedure is followed as described under Example 2 with the exception that there are used 25.1 g. (0.1 mole) of bis(3-aminopropyl)-β-phenylethylphosphine, $\phi CH_2CH_2P(CH_2CH_2CH_2NH_2)_2$, instead of 22.4 g. of bis(3-aminopropyl) phenylphosphine, and 14.6 g. (0.1 mole) of adipic acid instead of 16.6 g. of terephthalic acid. The resulting condensation polymer is obtained in the form of a light-brown, transparent solid from which fibers can be produced and molecularly oriented by drawing under tension. Many of the other properties are similar to those of the product of Example 1.

EXAMPLE 4

*Preparation of Polyamide from Bis(3-Aminopropyl) Phenylphosphine and Tetradecamethylene Dicarboxylic Acid*

A linear condensation polyamide is made from the above reactants using essentially the same procedure described under Example 2. In this example, however, there is used 31.4 g. (0.1 mole) tetradecamethylene dicarboxylic acid instead of 16.6 g. of terephthalic acid. The same amount (0.1 mole; 22.4 g.) of bis(3-aminopropyl) phenyl phosphine is employed as in Example 2. A good yield of a transparent, light-brown, condensation polyamide, which qualitatively shows good adhesive characteristics, is obtained. In general, its properties are very similar to those of the products of Examples 1, 2 and 3, but differ therefrom by having a somewhat lower softening point. Thus, the product of this example shows a tendency to be soft even at room temperature.

EXAMPLE 5

*Preparation of Polyamide from Bis(3-Aminopropyl) Phenylphosphine and Quadric Acid*

In this example the dicarboxylic acid employed is quadric acid, the formula for which is

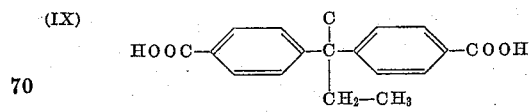

Using 22.4 g. (0.1 mole) of bis(3-aminopropyl)phenylphosphine and 29.8 g. (0.1 mole) of quadric acid and following essentially the same procedure described under Example 2, a good yield of linear condensation polymer having the following properties is obtained:

| | |
|---|---|
| Appearance | Light, yellow, brittle solid. |
| Intrinsic viscosity in dimethyl formamide at 30° C | 0.09. |
| Softening point | 100° C. |
| Flow point | 115° C., yielding a clear, colorless liquid. |

The polymer of this example has a relatively low molecular weight, and relatively poor adhesive properties as compared with the polymers of the other examples.

EXAMPLE 6

*Preparation of Polyamide from Bis(ω-Aminododecyl) Phenylphosphine and Adipic Acid*

In this example there are used 4.75 g. (0.01 mole) of bis(ω-aminododecyl) phenylphosphine and 1.46 g. (0.01 mole) of adipic acid. The procedure followed is essentially the same as that described under Example 2. The resulting linear condensation polymer, which is obtained in a good yield, is a soft, light-brown, transparent material. It is almost a liquid at room temperature.

EXAMPLE 7

*Preparation of Polyamide from Bis(p-Aminophenyl) Octadecylphosphine and Adipic Acid*

The procedure employed in this example is essentially the same as that described under Example 2 with the exception that the following reactants and proportions thereof are used: 4.67 g. (0.01 mole) of bis(p-aminophenyl) octadecylphosphine and 1.46 g. (0.01 mole) of adipic acid. The resulting linear condensation polymer has properties which are similar to the properties of the product of Example 2.

EXAMPLE 8

*Preparation of Polyamide from Bis(p-Aminophenyl) Methylphosphine and Adipic Acid*

In this example reaction is effected between bis-(p-aminophenyl) methylphosphine (2.29 g.; 0.01 mole) and adipic acid (1.46 g.; 0.01 mole), the procedure being essentially the same as that described under Example 2. The resulting linear condensation polymer has a slightly higher melting range than the polymer of Example 2 but otherwise its properties are very similar to the properties of the polymer of that example.

EXAMPLE 9

*Preparation of Polyamide from Bis(3-Aminopropyl) Phenylphosphine and Sebacyl Chloride*

This example illustrates the use of so-called "interfacial" polymerization technique in producing a linear condensation polymer from bis(3-aminopropyl) phenylphosphine and sebacyl chloride.

The diamine (18.3 g.; 0.082 mole) is dissolved in 750 ml. of water which contains 9.2 g. (0.164) mole of potassium hydroxide. This aqueous solution at room temperature is added slowly to a solution of 17.1 g. (0.082 mole) of sebacyl chloride, also at room temperature (20°-30° C.), in 450 ml. of carbon tetrachloride contained in a 1-liter, tall-form beaker. Careful addition is necessary in order to prevent mixing at the interface. The white polymer film, which forms only at the interface of the two liquid layers, is drawn into a continuous rope by means of forceps. Semi-purification is achieved by removal of solvents through a Büchner funnel, followed by several washings with acetone and finally with water. After filtration, the polymer is dried in a vacuum oven maintained at 70° C. for about 10 hours. The yield of dried polymer, which is a white, somewhat rubbery solid, amounts to 22 g., which corresponds to 76% of the theoretical yield.

The linear condensation polymer of this example softens somewhat at temperatures slightly above room temperature, with definite softening occurring at 70°-75° C. It has a flow range of 90°-100° C. It melts to a clear, viscous, colorless fluid.

The adhesive performance of the polymer is evaluated by melting a small amount of the material on a glass slide. A second glass slide is placed over the melt so that there is a bonding surface of about 1 square inch. After cooling, the bonded area has a somewhat hazy appearance. Attempts to separate the slides by applying hand pressure results in breaking the glass slides with no indication that the bond has been ruptured. Based on the results of this test, the polymer properly can be rated as an excellent adhesive.

EXAMPLE 10

*Preparation of Polyamide from Bis(3-Aminopropyl) p-Tolylphosphine and Sebacyl Chloride*

Essentially the same procedure is followed as described under Example 9 with the exception that the following ingredients are used in the stated amounts instead of those employed in that example:

The diamine, bis(3-aminopropyl)-p-tolylphosphine, the formula for which is (X)

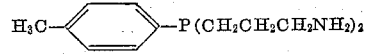

(23.7 g.; 0.1 mole) is dissolved in 1000 ml. water which contains 11.2 g. (0.2 mole) of KOH. This aqueous solution is added slowly to a solution containing 23.8 g. (0.1 mole) of sebacyl chloride in 500 ml. CCl₄, and the product is formed and isolated as in Example 9.

The properties of the linear polyamide of this example are very similar to those of the polyamide of Example 9.

EXAMPLE 11

*Preparation of Polyamide from Bis(3-Aminopropyl) Isobutylphosphine and Sebacyl Chloride*

Same as in Example 9 with these differences:

The diamine, bis(3-aminopropyl) isobutylphosphine (17 g.; 0.0836 mole), is dissolved in 600 ml. water which contains 9.36 g. (0.167 mole) of KOH. This aqueous solution is added slowly to a solution containing 20 g. (0.0836 mole) of sebacyl chloride in 400 ml. CCl₄, and the product is formed and isolated as in Example 9. The polymer can readily be drawn from the interface in the form of a white rope. This polymer is subsequently semi-purified, washed and finally dried as in Example 9. The dried polymer is a white, fibrous solid; yield 25.3 g. (82% of the theoretical).

The linear polyamide of this example softens at 50°-52° C. It has a flow range of 100°-113° C., and melts to a clear, colorless, viscous liquid. The polymer has good sticking characteristics when tested as described in Example 9. However, because of its soft nature the bond gradually fails. It contains the recurring unit structure represented by the formula (XI)

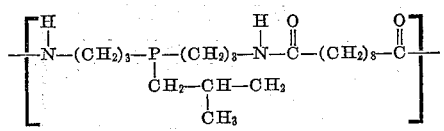

EXAMPLE 12

*Preparation of Polyamide from Bis(3-Aminoethyl) Cyclohexylphosphine and Sebacyl Chloride*

The procedure is the same as that followed in Example 9 with these differences:

The diamine, bis(3-aminoethyl) cyclohexylphosphine, the formula for which is (XII)

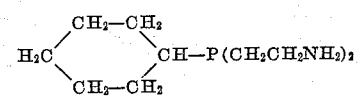

(20.1 g.; 0.1 mole) is dissolved in 1000 ml. water which contains 11.2 g. (0.2 mole) of KOH. This aqueous solution is added slowly to a solution containing 23.8 g. (0.1 mole) of sebacyl chloride in 500 ml. CCl$_4$, and the product is formed and isolated as in Example 9.

The properties of the polyamide of this example are very similar to those of the polyamide of Example 11.

EXAMPLE 13

*Preparation of Polyamide from Bis(3-Aminopropyl)-2-Butenylphosphine,*

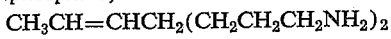

*and Sebacyl Chloride*

Exactly the same procedure is followed as described under Example 12, even to the quantities used, but substituting bis(3-aminopropyl)-2-butenylphosphine for bis(2-aminoethyl) cyclohexylphosphine. The properties of the resulting linear condensation polymer are very much like those of the product of Example 11.

EXAMPLE 14

*Preparation of Polyamide from Bis(3-Aminopropyl) Isobutylphosphine and Quadryl Chloride*

An attempt made initially to prepare a linear polyamide from the above reactants using the "interfacial" technique described under Example 9 is not satisfactory for the reason hereafter given.

The diamine, bis(3-aminopropyl) isobutylphosphine (20.0 g.; 0.0981 mole), is dissolved in 600 ml. water which contains 11.0 g. (0.1962 mole) of KOH. This aqueous solution is added slowly to a solution containing 32.8 g. (0.0981 mole) of quadryl chloride, the formula for which is (XIII)
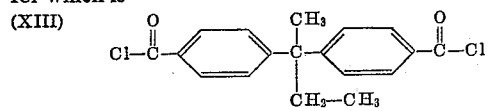

in 500 ml. CCl$_4$. Although a solid, white material forms at the interface, it can not be drawn from the interface in the form of a rope. The isolation technique is therefore modified as follows:

The reaction mass, that is, the two immiscible liquids with a solid at the interface, is agitated and the solid is separated from the liquids by filtration. The isolated solid is washed with acetone. The acetone-washed material is a gummy solid which is boiled in water for 5 minutes and dried. The dried polyamide is a white, crumbly solid; yield, 6 g.

EXAMPLE 15

*Preparation of Polyamide from Bis(p-Aminopropyl) Octadecylphosphine and Succinic Acid*

Essentially the same procedure is followed as described under Example 2 with the exception that there are used 4.67 g. (0.01 mole) of bis-(p-aminophenyl) octadecylphosphine instead of 22.4 g. (0.1 mole) of bis(3-aminopropyl)phenylphosphine, and 1.18 g. (0.01 mole) of succinic acid in place of 16.6 g. (0.1 mole) of terephthalic acid.

The properties of the polyamide of this example are generally similar to those of the product of Example 2, but it has a higher melting range.

It will be understood, of course, by those skilled in the art that our invention is not limited to the specific reactants or other ingredients employed in the foregoing examples, or to the specific procedure and conditions of reaction described in the individual example. Thus, instead of the particular substituted phosphine (i.e., a diamine containing phosphorus in the molecule) used in any of the foregoing examples, one can employ any other phosphine of the kind embraced by Formula V and where R, $m$ and $n$ have the same meanings previously set forth with respect to Formula I. Likewise, instead of the dicarboxylic acid or acyl halide employed in a particular example as the other difunctional reactant with the phosphine, one can use any other dicarboxylic acid having, as its sole reactive groups, two —COOH groups attached directly to a divalent hydrocarbon radical containing from 2 to 18 carbon atoms, inclusive, or the anhydrides or acyl halides of such acids if available. More specific examples of such dicarboxylic acids and other amide-forming compounds are the following: succinic, glutaric, glutaconic, αhydromuconic, β-hydromuconic, adipic, pimelic, suberic, azelaic, sebacic, 2-octenedioic, maleic, fumaric, itaconic, 1,9-nonanedicarboxylic, 1,10-decanedicarboxylic, brassylic, 1,12-dodecanedicarboxylic, acetylenic dicarboxylic acids, and the amide-forming derivatives thereof, e.g., the available anhydrides thereof, the acyl chlorides, acyl bromides and other acyl halides thereof. Other examples will be apparent to those skilled in the art from the aforementioned illustrative examples of divalent hydrocarbon radicals containing from 2 to 18 carbon atoms, inclusive, that are represented by R' in Formula I.

Instead of the hydrocarbon dicarboxylic acids mentioned above by way of example, one also may use halogenohydrocarbon dicarboxylic acids as, for example, chlorosuccinic, bromomaleic, perfluorosuccinic, dichloroadipic, trichlorosuberic, chloromaleic, nuclearly chlorinated quadric, tetrachlorophthalic acids, etc., and the available anhydrides thereof, as well as the acyl halides thereof.

The linear polyamides disclosed and claimed in the instant application are members of the broader class of linear polyamides which are characterized by the fact that they contain both trivalent phosphorus,

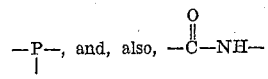

linkages. They may be described still more specifically as being sub-generic to linear polyamides containing the recurring unit structure represented by the general formula (XIV)
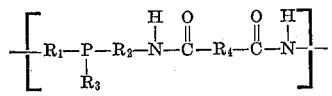

where $R_1$, $R_2$ and $R_4$ each represent a divalent hydrocarbon radical containing from 2 to 18 carbon atoms, inclusive, numerous examples of which have been given hereinbefore with reference to R' in Formula I; and $R_3$ represents a hydrocarbon (monovalent hydrocarbon) radical, numerous examples of which have been previously given with reference to R in Formula I. An example of a substituted phosphine (diamine) that can be used in the preparation of such linear polyamides is bis(p-anilino)phenylphosphine, the formula for which is (XV)
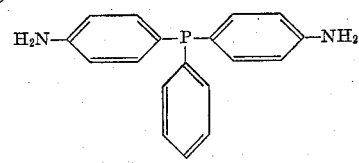

Another sub-group under the broader class of linear polyamides that are characterized by the fact that they contain both trivalent phosphorus,

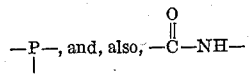

linkages comprises those linear polyamides containing the recurring unit structure represented by the general formula (XVI)
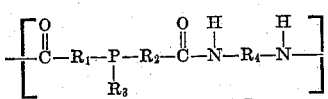

where $R_1$, $R_2$, $R_3$ and $R_4$ have the same meanings as given above with reference to Formula XIV and which latter, in turn, refers back to the meanings given in Formula I with reference to the meanings of R and R'.

Phosphorus-containing dicarboxylic acids that can be used in the preparation of linear polyamides embraced by Formula XVI include those represented by the following general formulas (XVII)
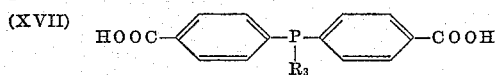

(XVIII)   $HOOC-(CH_2)_n-P-(CH_2)_nCOOH$
                            |
                            $R_3$ and (XIX)
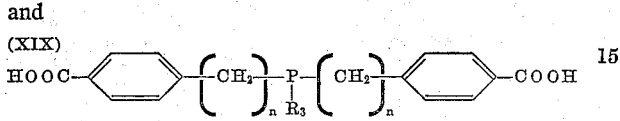

In Formulas XVII, XVIII and XIX, $R_3$ has the same meaning as given above with reference to Formula XVI and $n$ represents an integer from 2 to 12, inclusive. Any diamine containing two —$NH_2$ groups attached directly to a divalent hydrocarbon radical containing from 2 to 18 carbon atoms, inclusive, can be used in producing the linear polyamides embraced by Formula XVI. The equivalent of such diamines would be those exemplified by the diamine (piperazine) having the formula (XX)
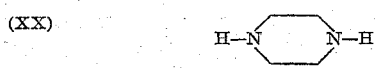

Still another sub-group under the broader class of linear polyamides that are characterized by the fact that they contain both trivalent phosphorus,

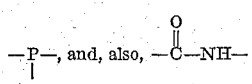

linkages are those linear polyamides containing the recurring unit structure represented by the general formula (XXI)
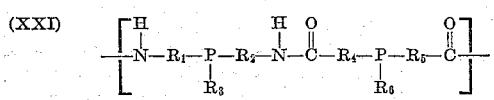

where $R_1$, $R_2$, $R_4$ and $R_5$ each represent a divalent hydrocarbon radical containing from 2 to 18 carbon atoms, inclusive, numerous examples of which have been given hereinbefore with reference to R' in Formula I; and $R_3$ and $R_6$ each represent a hydrocarbon radical, numerous examples of which have been given previously with reference to R in Formula I.

Linear polyamides containing the recurring unit structure embraced by XIV, XVI and XXI can be produced by the same general techniques described herein with reference to the production of the linear polyamides containing the recurring unit structure embraced by Formula I but using the appropriate reactants that will be apparent to those skilled in the art from the aforesaid Formulas XIV, XVI and XXI.

We claim:

1. A linear polyamide consisting essentially of the recurring unit structure represented by the general formula

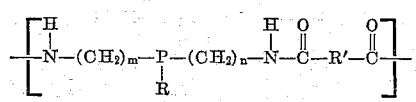

where $m$ and $n$ each represent an integer from 2 to 12, inclusive, R represents a hydrocarbon radical, and R' represents a divalent hydrocarbon radical containing from 2 to 18 carbon atoms, inclusive.

2. A linear polyamide as in claim 1 wherein R' represents the radical —$(CH_2)_4$—.

3. A linear polyamide as in claim 1 wherein R' represents the radical —$(CH_2)_8$—.

4. A linear polyamide as in claim 1 wherein R' represents the radical

5. A linear polyamide as in claim 1 wherein R represents a phenyl radical.

6. A linear polyamide as in claim 1 wherein R represents an isobutyl radical.

7. A linear polyamide as in claim 1 wherein $m$ and $n$ each represent 3.

8. A linear polyamide consisting essentially of the recurring unit structure represented by the formula

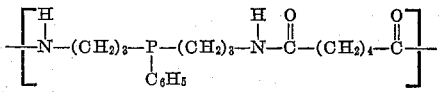

9. A linear polyamide consisting essentially of the recurring unit structure represented by the formula

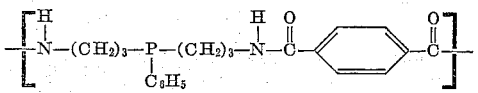

10. A linear polyamide consisting essentially of the recurring unit structure represented by the formula

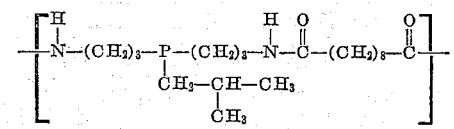

11. The method of preparing a linear polyamide which comprises effecting a condensation reaction at a temperature within the range of from —30° C. to about 325° C. between substantially equal molar proportions of two different difunctional reactants, one of which ($a$) is a phosphine of the formula

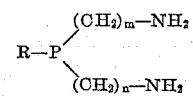

where R represents a hydrocarbon radical, and $m$ and $n$ each represent an integer from 2 to 12, inclusive, and the other of which ($b$) is a compound selected from the group of compounds of the Formulas A

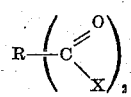

and B

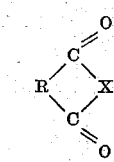

where each X in Formulas A and B represents an amide-forming group and R represents a divalent hydrocarbon radical containing from 2 to 18 carbon atoms, inclusive.

12. A method as in claim 11 wherein the compound of ($b$) has the formula

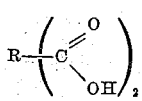

where R represents a divalent hydrocarbon radical containing from 2 to 18 carbon atoms, inclusive.

13. A method as in claim 11 wherein the compound of ($b$) has the formula

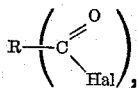

where R represents a divalent hydrocarbon radical containing from 2 to 18 carbon atoms, inclusive, and Hal represents a halogen atom.

References Cited in the file of this patent

UNITED STATES PATENTS 2,646,420  Morgan _____ July 21, 1953

OTHER REFERENCES

Korshak: Journal of Polymer Science, vol. XXXI, pages 319–326 (1958).

Organophosphorus Compounds. Kosolapoff, page 98 relied on, 1950, John Wiley & Sons, Inc., New York.

UNITED STATES PATENT OFFICE
CERTIFICATE OF CORRECTION

Patent No. 3,043,810                          July 10, 1962

William G. Deichert et al.

It is hereby certified that error appears in the above numbered patent requiring correction and that the said Letters Patent should read as corrected below.

Column 1, line 11, for "The" read -- This --; column 2, lines 44 to 46, formula (IV) should appear as shown below instead of as in the patent:

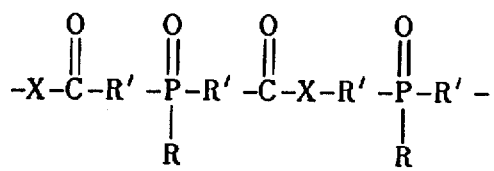

column 4, line 8, for "unles" read -- unless --; line 30, for "1.5795" read -- 1.5695 --; same column 4, lines 46 to 58, in the formula, for that portion above the arrow reading "-H$_2$C" read -- -H$_2$O --; column 5, line 8, for "celar" read -- clear --; column 6, lines 67 to 71, formula (IX) should appear as shown below instead of as in the patent:

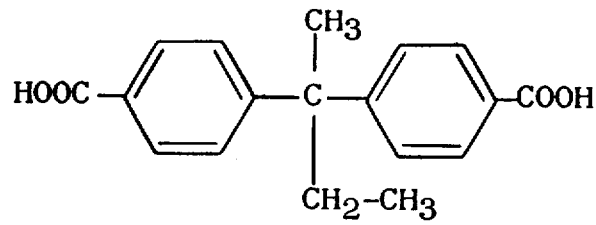

column 7, lines 4 to 9, the table should appear as shown below instead of as in the patent:

| | |
|---|---|
| Appearance | Light, yellow, brittle solid. |
| Intrinsic viscosity in dimethyl formamide at 30° C | 0.09. |
| Softening point | 100° C. |
| Flow point | 115° C., yielding a clear, colorless liquid. |

3,043,810 column 8, lines 58 to 63, formula (XI) should appear as shown below instead of as in the patent:

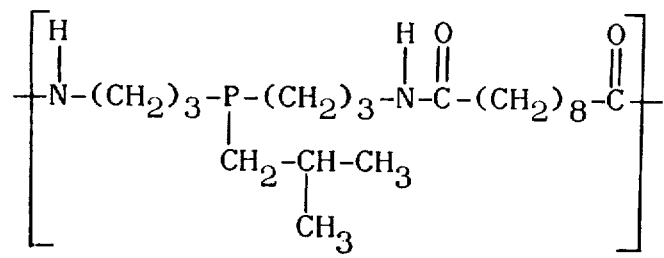

column 9, line 12, for "CH$_3$CH=CHCH$_2$(CH$_2$CH$_2$CH$_2$NH$_2$)$_2$" read -- CH$_3$CH=CHCH$_2$P(CH$_2$CH$_2$CH$_2$NH$_2$)$_2$ --; line 51, for "Bis(p-Aminopropyl)", in italics, read -- Bis(p-Aminophenyl) --, in italics; column 10, lines 8 and 9, for "ahydromuconic" read -- α-hydromuconic --.

Signed and sealed this 30th day of October 1962.

(SEAL)
Attest:

ERNEST W. SWIDER
Attesting Officer

DAVID L. LADD
Commissioner of Patents